Figure 1:
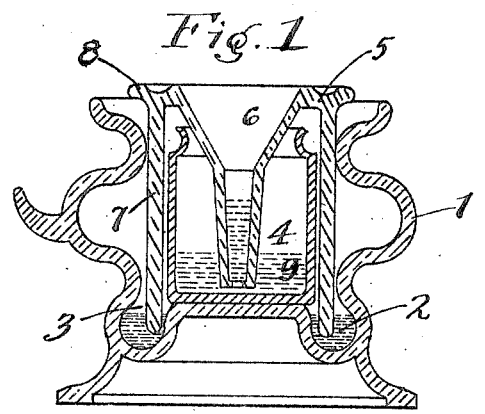

No. 811,536. PATENTED FEB. 6, 1906.
F. M. ASHLEY.
INKSTAND.
APPLICATION FILED OCT. 7, 1902.

2 SHEETS—SHEET 1.

Witnesses
George N. Ken,
Lester C. Taylor

Frank M. Ashley, Inventor
By his Attorney
C. N. Edwards

No. 811,536. PATENTED FEB. 6, 1906.
F. M. ASHLEY.
INKSTAND.
APPLICATION FILED OCT. 7, 1902.
2 SHEETS—SHEET 2.
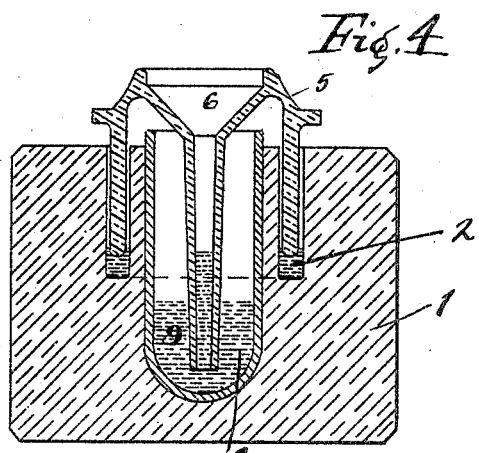
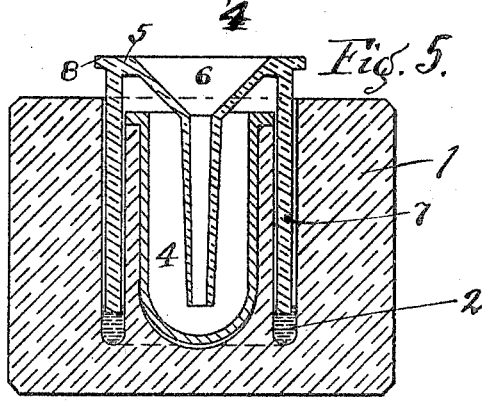
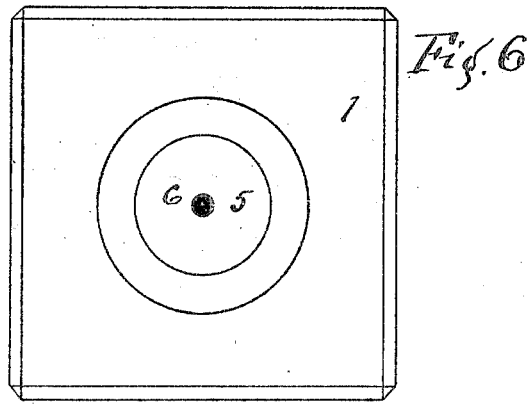
Witnesses
George N. Terry
Lester C. Taylor
Inventor
Frank M. Ashley
By his Attorney
C. V. Edwards

UNITED STATES PATENT OFFICE.

FRANK M. ASHLEY, OF NEW YORK, N. Y.

INKSTAND.

No. 811,536.   Specification of Letters Patent.   Patented Feb. 6, 1906.

Application filed October 7, 1902. Serial No. 126,285.

*To all whom it may concern:*

Be it known that I, FRANK M. ASHLEY, a citizen of the United States, residing at New York city, in the county of Kings and State of New York, have invented certain new and useful Improvements in Inkstands, of which the following is a full, clear, and exact specification.

This invention relates to ink-wells; and its object is to construct a well which shall be compact and economical in construction and which will be easy and delicate in operation.

Heretofore ink-wells have been constructed comprising a sealing fluid of water or other fluid adapted to support a floating dip-funnel, which when pressed down by the pen compresses the air within the same and causes the ink to rise in the funnel. Such constructions are, however, objectionable in that it requires considerable pressure to operate them and they constantly require attention as the water evaporates. Another objectionable feature is that although the ink-reservoir may be full, yet if the sealing fluid evaporates and the dip-funnel drops the well will not operate and will give no indication of the cause of the trouble. I propose to construct a well which will be operative so long as any ink remains in the reservoir and which as soon as the ink in the reservoir is exhausted will become inoperative.

According to my invention I propose to utilize a sealing fluid which will not evaporate and to so construct the dip-funnel that it will not float because of the specific gravity of the sealing fluid alone, but which will float only by the combined action of its buoyancy and the pressure of the air inclosed within it.

The invention will be more particularly described with reference to the forms of ink-wells shown in the accompanying drawings, in which—

Figures 1 to 5, inclusive, are sectional views of various modifications of ink-wells embodying my invention; and Fig. 6 is a top view of the well shown in Fig. 5.

Referring more particularly to the drawings, 1 represents a suitable base containing a sealing fluid 2, of mercury or other suitable fluid. The base may be of any suitable shape or material, either of blown glass, as in Fig. 1, or of molded or pressed glass, as in Figs. 2 to 5, inclusive, and a channel 3 for holding the sealing fluid 2 may be formed within the base, as in Figs. 1, 3, 4, and 5, or the fluid may be contained in and completely cover the bottom of the well.

It will be understood that it is not necessary that the channel extend completely around the well, as it may be in two or more sections and each section be filled with fluid without departing from the spirit of my invention.

Figure 2:
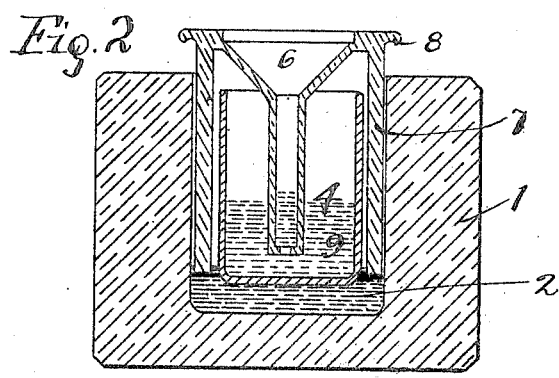
Figure 3:
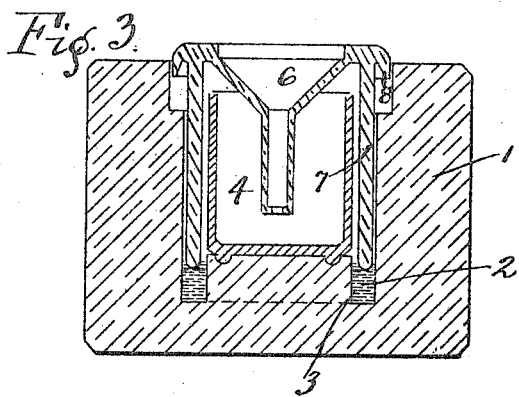

4 is the ink-cistern, which fits into the base and may rest on the bottom of the well, as in Figs. 1, 3, 4, and 5, or float in the fluid at the bottom of the well, as in Fig. 2.

5 is a float comprising a dip-funnel 6, open at both ends, loosely fitted into and extending a suitable distance into the ink-cistern, and supports 7 at its outer edge, adapted to extend into the body portion and rest on the sealing fluid 2 contained therein. The float may be of hard vulcanized rubber or any other suitable material, or the dip-funnel may be of one material and the supports of another.

8 is a flange or rim running around the top of the float and adapted to engage with the body portion of the stand and to arrest the downward movement of the float after it has fallen a predetermined distance.

9 is the ink in the reservoir.

The operation of the device is as follows: A suitable amount of sealing fluid is poured into the channel 3 and a suitable amount of ink is poured into the cistern 4, which is placed in position in the base. The float 5 is now placed in position, the supports 7 extending downward into the sealing fluid and the dip-funnel 6 extending into the ink 9. It will be seen that the air trapped between the inner sides of the float and the sealing fluid and ink in the cistern will serve to bring up the float. When the float is forced downward, the air within it will press against the ink and force it up through the funnel, where it can be used. When the pressure is released, the float will rise and the ink will fall back into the cistern. As the ink is gradually used the float will fall lower and lower, until such an amount has been used that the rim 7 will rest upon the top of the body portion and the float will become inoperative, thus indicating that the cistern needs refilling. This may be done by removing the float and filling by simply pouring ink directly into the cistern or through the funnel. It will be seen that the higher the level of the ink in the cistern is the longer it will last, provided the level of the sealing fluid in the reservoir is proportionally high.

Having thus described my invention, I declare that what I claim as new, and desire to secure by Letters Patent, is—

1. In an inkstand of the class described, the combination with a base portion provided with an annular groove in the bottom thereof, a sealing fluid in said annular groove, a cistern adapted to contain fluid, and a float carrying a dip-tube and dip, the edges of the float adapted to rest in said annular groove, and the dip-tube adapted to project into the said cistern; substantially as described.

2. In an inkstand of the class described, the combination with a base portion provided with an annular groove adapted to contain a sealing fluid, a removable cistern adapted to contain ink, a combined float, and ink-tube, the lower edges of said float adapted to rest in said annular groove and the dip-tube adapted to extend within said cistern.

3. In an inkstand of the class described, a base portion containing a fluid seal, in combination with an ink-cistern resting in said base portion, a combined float and dip-tube, said float inclosing said cistern and being of greater length than the same; substantially as shown and described.

4. In a stand of the class described, the combination of a base portion having a well therein, an ink-cistern adapted to contain ink, said cistern resting in said well by gravity alone, whereby it may be easily removed therefrom, a channel around the bottom of said well containing a heavy normally non-evaporable fluid, and a float having downwardly-extending sides, resting in said fluid, and a downwardly-extending ink-tube adapted to rest in the ink; substantially as described.

5. In an inkstand of the class described, the combination of a base portion having a removable cistern therein, a channel in said body opened at the top, the upper part of which is formed by the inside of said base portion and the outside of said cistern, a heavy normally non-evaporable fluid in the bottom of said channel and a float comprising an ink-tube, which extends downwardly into said cistern and having a dip-funnel on the top thereof, and an exterior wall which extends downwardly into said fluid in said channel; substantially as described.

6. In an inkstand of the class described, the combination with a base portion having a removable cistern therein, a fluid seal in said base portion, and a float adapted to trap a supply of air between said fluid seal and the ink on which said float rests, and means whereby the float will drop when a predetermined amount of ink has been used from said well due to the escape of air from the float whereby its emptiness is indicated; substantially as shown and described.

7. In an inkstand of the class described, a base portion containing a heavy normally non-evaporable seal in the base thereof, a removable ink-cistern containing ink resting in said base portion, a float comprising a cylindrical shell carrying a dip cup and tube, air inclosed within said float between said ink and said sealing fluid whereby said float is buoyed up, and by the compression of which, the ink is forced to the dip-cup; substantially as shown and described.

8. In an inkstand of the class described, the combination with a base portion containing a sealing fluid, a removable cistern and a float, said float comprising a dip-tube and side walls, the latter adapted to contact with said sealing fluid, and the dip-tube adapted to project into said cistern; substantially as described.

9. In an inkstand of the class described, the combination with a base portion provided with a groove, a sealing fluid in said groove, a removable cistern adapted to contain fluid, and a float carrying a dip-tube, the edges of the float adapted to rest in said groove and the dip-tube adapted to project into the said cistern; substantially as described.

In testimony whereof I affix my signature in presence of two witnesses.

FRANK M. ASHLEY.

Witnesses:
C. V. EDWARDS,
HENRY BEST.